Aug. 5, 1958  E. SZIGETI  2,846,281
PISTON RING
Filed Aug. 16, 1954  2 Sheets-Sheet 1
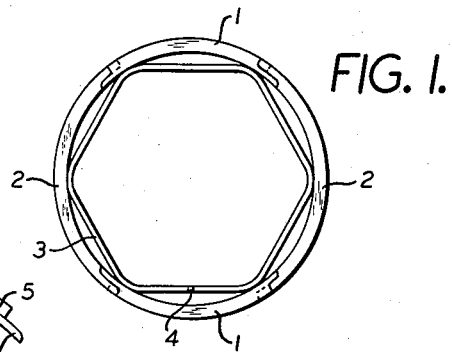
FIG. 1.
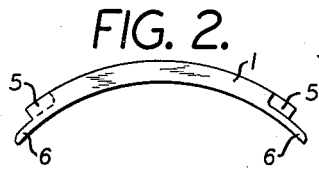
FIG. 2.
FIG. 3.
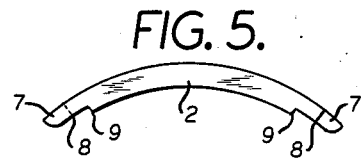
FIG. 5.
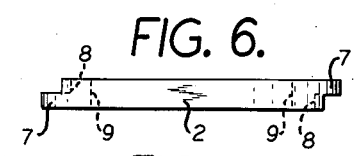
FIG. 6.
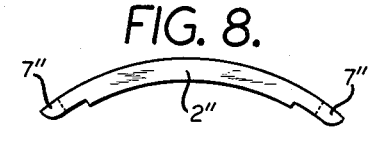
FIG. 8.
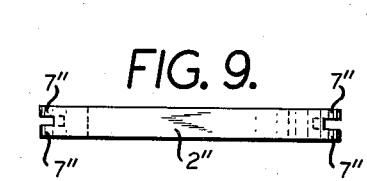
FIG. 9.
FIG. 12.
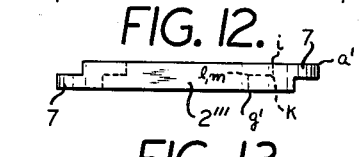
FIG. 13.
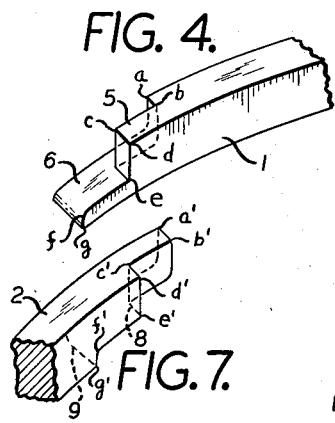
FIG. 4. FIG. 7.
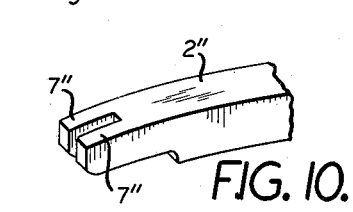
FIG. 10.
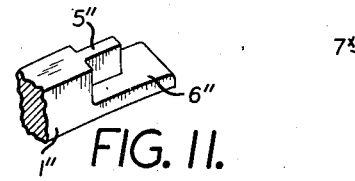
FIG. 11.
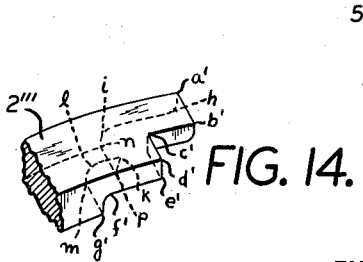
FIG. 14.
FIG. 15.
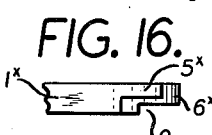
FIG. 16.
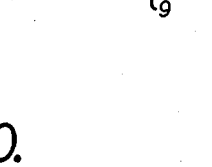
FIG. 17.
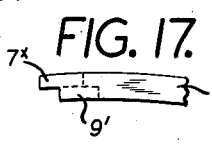
FIG. 18.
INVENTOR
ELEMER SZIGETI
BY
ATTORNEY Aug. 5, 1958  E. SZIGETI  2,846,281
PISTON RING
Filed Aug. 16, 1954  2 Sheets-Sheet 2
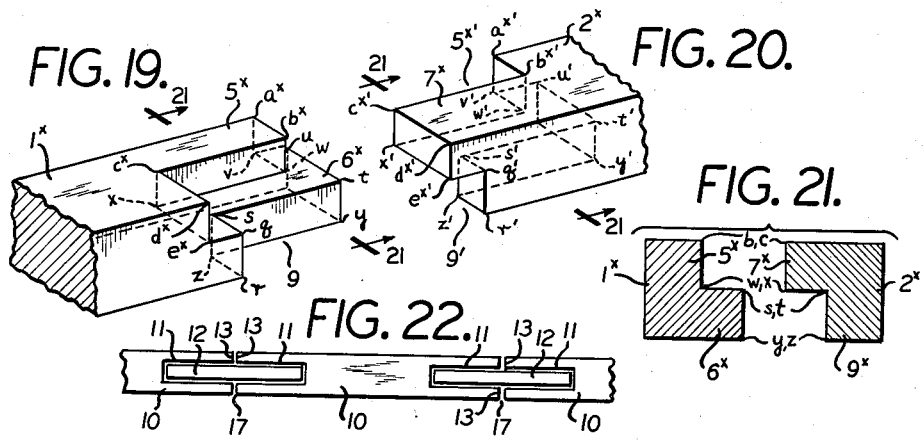
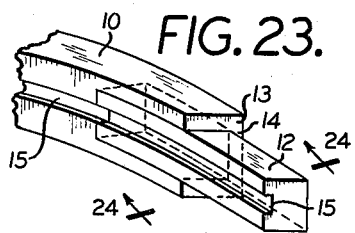
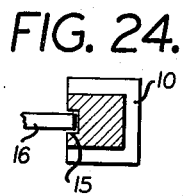
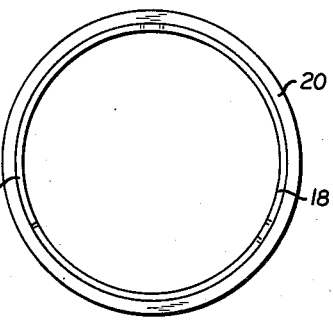
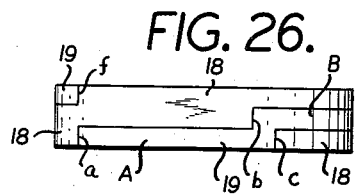
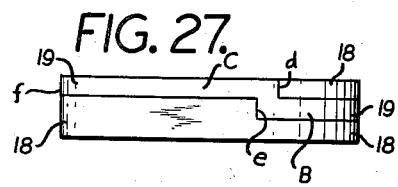
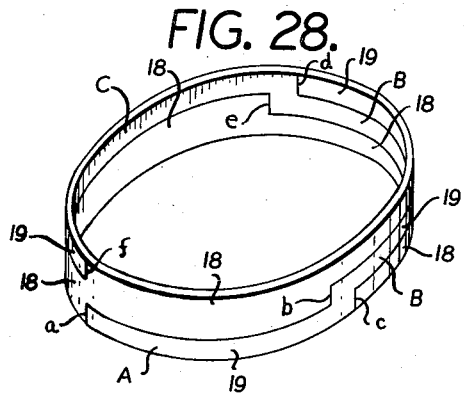
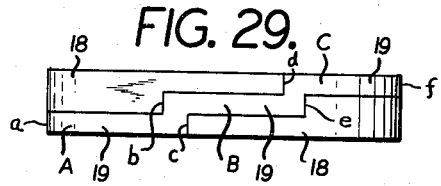
INVENTOR
ELEMER SZIGETI
ATTORNEY United States Patent Office 2,846,281
Patented Aug. 5, 1958

2,846,281

PISTON RING

Elemér Szigeti, Antwerp, Belgium

Application August 16, 1954, Serial No. 450,121

5 Claims. (Cl. 309—46)

The present invention relates to piston rings with or without insets between the piston ring segments proper, and has for its object on the one hand to secure the best possible seal between the rings and the cylinder walls and at the joints, and on the other hand to increase the durability of the rings, to simplify their production, and to reduce their costs.

It is true that piston rings are known trying to attain the same object, but they are extremely complicated or the possibility of accommodation of the rings or ring segments to the cylinder walls is very limited, because in most cases these rings consist of a single piece having a complementary inset at the joint. Those, however, which are composed of several parts, have invariably a correspondingly greater number of untight points. Suppleness is not sufficient, if the gaps are not efficaciously closed.

Applicant's own Patent No. 2,621,990 dated December 16, 1952, teaches already an arrangement in a split piston ring having at least one integral piston ring portion, in the adjacent ends of which is disposed an inset and a projection extends from each end of the ring portion in peripheral direction. The inset has a cross-section complementary to the projection of the end of the ring portion and is of constant cross-section substantially throughout its entire length in symmetrical arrangement, in axial, radial and peripheral direction, and the inner and outer periphery and the side faces are flush with the corresponding faces of the ring portion and the inset has parallel side faces and is inserted into the ring portion from the inner side of the piston ring. Finally, resilient means are secured to the inner face of the ring portion which exert pressure against the inset in radial direction to provide a fluid-tight contact between the inset and piston ring, respectively, and the cylinder wall. While this arrangement brought about quite beneficial results, the present invention aims to further improve these results in particular in cylinders where very high pressure is used.

It is, therefore, another object of the present invention to eliminate these drawbacks, and to meet the demand for a snug fit of the ring segments in all positions of the piston by having the ring segments, and—if there are insets—also these insets, engaging stepwise, in the circumferential direction, axially, or radially, so as to warrant not only a link-like mobility of the piston ring segments in respect to each other, but also an optimum of mobility of the segments perpendicularly to the cylinder wall. Suitable springs of the ring, polygonal, or laminated type bring about an elastical pressing of these articulated ring segments to the cylinder walls. Besides, it is imperative that the cross-section of the ring should be the same, without any exception, on the entire circumference, lest the high and lasting, but at the same time incessantly varying mechanical and thermal stresses and strains, to which the rings are subjected, result in the various parts of the circumference being differently stressed, thus reducing the life and jeopardizing the dependability of the rings.

It is still another object of the present invention to provide a piston ring which by way of a combined stepwise engagement of the ring segments and/or the insets assures link-like radial mobility of the constituent parts of the ring, and for the best possible seal of the gaps, preventing the escape of gas and stopping the loss of oil, whereby the various individual cross-sections complement each other to a full, simple, rectangular cross-section. The total effect of the present invention brings about an equal wear of the rings and of the cylinder, an extreme saving in the consumption of fuel and lubricating oil and the removal of the necessity to overhaul the engine too often, thereby, increasing the life of the automotive engine or any other piston engine. Taken into consideration the appreciably great number of piston engines and of automotive vehicles, in operation on land, on sea, and in the air, the savings to be achieved by the use of the piston rings according to the present invention is bound to amount to very large sums.

With these and other objects in view, which will become apparent in the following detailed description, the present invention will be clearly understood in connection with the accompanying drawings, in which:

Figure 1 is a plan view of a quadripartite piston ring comprising two shorter and two longer segments and a polygonal spring;

Fig. 2 is a plan view of one of the shorter segments;

Fig. 3 is a rear elevation thereof;

Fig. 4 is a perspective view of one end of the segment, shown in Fig. 2 on an enlarged scale;

Figs. 5 and 6 are a plan view and a rear elevational view of one of the longer segments;

Fig. 7 is a perspective view of one end of the segment shown in Fig. 5;

Figs. 8 and 9 are a plan view and a rear elevational view from another embodiment of one of the two ring segments;

Figs. 10 and 11 are perspective views of the two engaging ends of the ring segments disclosed in Figs. 8 and 9;

Figs. 12 and 13 are a plan view and a rear elevational view of a still further embodiment of the ring segments;

Fig. 14 is a perspective view of one end of the segment shown in Figs. 12 and 13;

Figs. 15, 17 and Figs. 16, 18 are plan views and rear elevational views of the end portions of a fourth embodiment of the ring segments;

Figs. 19 and 20 are perspective views of the respective end portions of the ring segments shown in Figs. 15 to 18;

Fig. 21 is a section along the lines 21—21 of Figs. 19 and 20, respectively;

Fig. 22 is a front elevational fragmentary view of a further embodiment of a multipartite piston ring with insets;

Fig. 23 is a fragmentary perspective view of a ring segment end with inset thereto;

Fig. 24 is a section, along the lines 24—24 of Fig. 23 with spring;

Fig. 25 is a plan view of still another embodiment with reciprocal stepwise engagement of the ring parts of a combined piston ring;

Fig. 26 shows the front elevational view of the embodiment shown in Fig. 25;

Fig. 27 is a rear elevational view of the embodiment shown in Fig. 25;

Fig. 28 is a perspective view of the embodiment shown in Fig. 25;

Fig. 29 is a rear elevation of the embodiment shown in Fig. 25.

Referring now to the drawing and particularly to Figs. 1–7, the piston ring comprises two shorter segments 1 and two longer segments 2. A spring 3 of polygonal shape is disposed inside the piston ring, and a space 4 is provided between its ends. The ends of the segment 1 are stepped down in the direction of its periphery, as shown in Fig. 2, and also in radial direction, as shown in Fig. 3, thus resulting in the steps $a$, $b$, $c$, $d$, and $e$, $f$, $g$ (see Fig. 4), whereby the edge of the step $f$ is rounded off. As a result thereof a rib 5 is formed, as well as an extension step 6, as indicated in Figs. 1 and 4. In the adjacent segment 2 (Figs. 5 to 7) there is a complementary projection 7 and undercut $e'$, $g'$. The projection 7 and the corresponding portion of the segment 1 receiving the latter are likewise rounded off. The steps $a$, $b$, $c$, $d$, of segment 1 correspond with the complementary steps $a'$, $b'$, $c'$, $d'$ of segment 2, whereas the steps $d$, $e$, $f$, $g$, of segment 1 correspond with the complementary steps $d'$, $e'$, $f'$, $g'$, of segment 2. A lower edge 8 of the upper radial step, and also a lower edge 9 of the lower radial step of segment 2, is formed (Fig. 7). These step edges 8 and 9 are also clearly shown in Figs. 5 and 6. The ends of each of the segments 1 and 2 are not identical, they are rather complementary to each other. The radial, link-like movability of the segments 1 and 2 relative to each other, and the closing of the complementary step cuttings are clearly disclosed in Figs. 4 and 7. It is obvious that the piston ring has the same rectangular cross-section over its entire circumference, in view of the fact that the cross-sections of the respective segments 1 and 2 complement each other most accurately, so as to form jointly the rectangular cross-section of the piston ring.

The embodiment shown in Figs. 8–11 differs substantially from that disclosed in Figs. 1–7 by the fact that the former rib 5, which is in the present embodiment the rib 5″, is located in the center of the cross-section of the piston ring, so that correspondingly the former complementary projection 7 (Fig. 7) had to be divided into two symmetrical projections 7″, whereas the extension step 6″ corresponds exactly with the former extension step 6. The undercut provided for receiving the extension step 6″ is formed equally with the former extension step 6. The extension step lies flush with the inner ring face. The link-like movability of the segments and the continuous rectangular cross-section of the piston ring are the same in this embodiment as in the former.

The embodiment disclosed in Figs. 12–14 has also been developed from the structure disclosed in Fig. 7. The steps, $a'$, $b'$, $c'$, $d'$ as well as $d'$, $e'$, $f'$, $g'$, are identical with the equivalent steps shown in the embodiment of Fig. 7. The undercut $e'$, $f'$, $g'$, is again stepped down in one half of the width of the piston ring. The transversal edge, beginning at $g'$, does not run through, but reaches only the point $m$ at about the center of the width of the piston ring. Beginning at the rear the undercut goes only as far as $i$, $n$. A step edge $n$ to $p$ runs in parallel to the edges terminating in front at $e'$ and $g'$. The lower front edge, beginning at $g'$ in front on the right hand side, corresponds to the lower edge on the rear $n$, while the rounding-off $f'$ $l$ of the main under-cut corresponds with the rounding-off $i$ $k$ of the shortened under-cut $h$ $i$ $n$. By providing a step in the under-cut, the joint between two adjacent ring segments is safe agaist escape of gases. The formation of the piston rings in accordance with the present invention is comparatively simple and is achieved in the following manner:

First the main under-cut is milled, whereupon on the one half of the width of the piston ring the enlargement $k$ $l$ $m$ is added. Finally the cut $b'$, $c'$, $d'$ is milled. The complementary end portion of the adjacent segment is made in analogous manner as shown in Fig. 4.

A still further embodiment is disclosed in Figs. 15–21. Fig. 19 shows the present embodiment clearly similar to the showing of Fig. 4, yet in opposite direction, i. e. with the extension step $6^x$ protruding to the right, and $5^x$ corresponds with the rib 5 of Fig. 4. The segment portion 1 in Fig. 4 is here equivalent to the part $1^x$, while the segment portion 2 of Fig. 7 is the equivalent of the segment portion $2^x$ in Fig. 20. The extension step $6^x$ is cut out angularly at 9 (Fig. 19), and takes up the lower rib $r'$, $z'$, $s'$, $t'$, $y'$, of the segment $2^x$. Hence, no gases can escape through the gaps $r$, $q$, $s$, $z$ (Fig. 19), and $r'$, $q'$, $s'$, $z'$, nor through the gaps $u$, $t$, $y$ (Fig. 19), and $u'$, $t'$, $y'$ (Fig. 20). The way through the gap $c^x$, $d^x$, $e^x$, $x$ (Fig. 19) is obstructed by the rib $5^x$, the way through the gap $a^x$, $b^x$, $w$, $v$ (Fig. 19) by extension block $e^{x'}$, $x'$, $c^x$, $d^{x'}$ at the entering corner $a^{x'}$, $v'$, $w'$, $b^{x'}$. An escape of gas is likewise impossible along the Z-shaped middle face $e^x$, $q$, $s$, $t$, $u$, $v$, $w$, $x$ (Figs. 16 and 19), on which the analogous Z-shaped face $e^{x'}$, $q'$, $s'$, $t'$, $u'$, $v'$, $w'$, $x'$ (Figs. 18 and 20) is located, in view of the fact that the way along this middle face is broken up twice. Therefore, in this embodiment too each gap is perfectly seal-proof. The same refers to the radial direction in which an escape of gas is likewise impossible as may be seen from Fig. 21. This arrangement indicates an ideally simple and reciprocal "L" or angle engagement of the two steps of the two engaging parts. Besides, these two complementary end portions of the segments $1^x$ and $2^x$ are easily produced. The double engagement of this embodiment of the piston ring brings about saving of so much fuel and oil, and achieves such an unexpected high compression even with worn-out cylinders, that the provision of the present piston rings turn out to be economical in the last analysis. The only additional operation required for making segment $1^x$ is the milling out of the under-cut 9 (Fig. 19), while in case of segment $2^x$ only the undermilling of the Z-shaped face is additionally necessary, whereby the rib $r'$, $q'$, $s'$, $z'$, $t'$, $y'$ (Fig. 20) is made to fit the cut 9 (Fig. 19). The simplest way to eliminate any manufacturing difficulty is to produce these parts by injection molding out of high heat resistant artificial (plastic) masses, and in particular Teflon or silicon is preferably used.

The step-like sealing engagement may be achieved in a plurality of different ways. One of these ways is e. g. disclosed by the embodiment shown in Figs. 22–24, showing a multipartite ring in which the steps are formed by U-shaped or channel-shaped millings 11 at the ends of the ring segment 10, arranged in circumferential direction. At the same time these millings form also the symmetrical steps in the axial direction. The insets 12 are fitted into these recesses 11 with a very slight play, so as to close almost entirely the butt joint between the ends of the segments. As is clearly disclosed in Fig. 23 a channel preferably in the shape of a U is formed in circumferential direction, as well as in radial direction, so that gas cannot escape in either of the two directions. Thus, a pocket is formed in which one half of the inset 12 is lodged. In order to secure a perfect homogeneity of the cross-section along the entire length of engagement another embodiment of the piston ring has been devised in which the channel extends radially through the entire ring. Then, the formation of lateral gaps located at both sides of the inset is unavoidable, but these gaps are extending in the radial direction so that the escape of gas is without importance, considering that the outer surface of the ring snugly nestles to the inner wall of the cylinder. On the other hand, the ring segment and the inset constitute a perfect seal against the axial pressure of the gases. The inset overbridges and closes the butt joint between the terminal faces 13 of each group of two ring segment ends abutting, while the formation of an axial gap on the U shaped yoke 14 of the channel, which does not pass through the full radial width, has been avoided.

A polygon-shaped spring 16 may be used, as shown in Fig. 1, which spring may engage the grooves 15 arranged on the inner faces of the segments 10 and of the insets 12.

In case the piston ring is made of one single piece (monolithic piston ring) the U-shaped channel and the inset are restricted to the joint of the ends of the one-piece ring.

The pocket shape of the channel is disclosed in Fig. 23, and the continuous channel is disclosed in Fig. 22. Fig. 22 constitutes a linear rolling up of the inner surface of a ring segment, provided with symmetrical terminal channels, to which are joined two adjacent segments, whereby the insets 12 cover the gaps 17 which for the sake of clearness are drawn on an exaggerated scale. It is not necessary to have the channels pass through entirely, as it is sufficient if only a part of them passes fully through, so that a step-shaped projection of the inset closes the gaps for the greatest part, in axial and radial direction.

A particular stepwise arrangement for securing the best possible seal of multipartite rings is shown in Figs. 25–29. The characteristic features of this mode of execution are clearly shown in Figs. 28 and 29. At least two monolithic (one-piece) piston rings 18 and 19 are joined together stepwise in the axial and the circumferential direction. Fig. 29, shows a linear rolling up of the circumference of the piston ring from the section line XXIX—XXIX, in the counter-clockwise direction, and indicates the manner in which the three-step ring 19 is inserted into the complementary shaped ring 18. The two rings have a slight play between the axial joints of the steps a, b, c, d, e, f. The peripherically adjoining edges contact each other. As the axial joints are covered by the second ring, the seal in the axial direction is absolutely tight. The ring 18 begins with the axial step-edge c, Fig. 29, and Fig. 28, at the right hand side, and then extends in the direction to the right, around the entire piston ring, to the uppermost step edge d. Consequently, its center coincides approximately with the section line XXIX—XXIX. On the other hand, the ring 19 begins at the vertical joint a on that line (Figs. 28 and 29) and extends also in the direction to the right, around the entire ring up to the uppermost joint f, in Fig. 28, again at the section line XXIX—XXIX. The middle is almost diametrically opposed to the section line XXIX—XXIX. This signifies that the pressures exercised by the two rings 18 and 19 are practically compensated which is of great importance as, in general, with one-piece rings these pressures are different in the middle and at the ends. Further, it must be taken into account that the ring 18 is of different height on the two sides of its center, while towards its ends, which overlap, the heights are reduced, but equal, while the ring 19 has practically the same height on its entire circumference (with the exception of the transitions from one step to another), the steps A, B, C (Figs. 28 and 29), however, being located at various axial heights of the total ring. Fig. 27 is a rear view of the piston ring. The spring and pressure effect of the two rings 18 and 19 can be reinforced by springs inserted e. g. according to Fig. 1, whereby simultaneously a uniform pressure is attained around the entire circumference. Fig. 25 shows the two rings 18 and 19 disposed in a cylinder 20.

It is explicitly stated that the enumeration and the description of the embodiments mentioned above does not exhaust the inventive matter. While I have disclosed several embodiments of the present invention, it will be understood that these embodiments are given by example only and not in a limiting sense, the scope of the present invention being determined by the objects and the claims.

I claim:

1. In a split piston ring, at least one integral piston ring portion, a projection extending from at least one end of said ring portion in peripheral direction, said projection of one end of said ring portion having a cross-section complementary to that of an adjacent end and both said projections being combined of constant cross-section and equal with that of the main portion of said piston ring, and each of said projections having at least one step in axial and peripheral directions, and both said steps having a common face disposed in a plane extending in the direction of the main axis of said piston ring.

2. In a split piston ring, at least one integral piston ring portion, a projection extending from at least one end of said ring portion in peripheral direction, said projection of one end of said ring portion having a cross-section complementary to that of an adjacent end and both said projections being combined of constant cross-section and equal with that of the main portion of said piston ring, and each of said projection having at least one step in axial, radial and peripheral directions and said three steps having a common face disposed in a plane extending in the direction of the main axis of said piston ring.

3. The piston ring, as set forth in claim 1, which includes a radial rib disposed at one of the said adjoining step-like ends of the said piston ring portion and the other of the said adjoining step-like ends of the said piston ring portion having a cut-out receiving the said rib, and one end of the said piston ring portion having an under-cut, and the other end of the said piston ring portion having an extension step to be received by the said under-cut, the said under-cut extending beyond the said rib.

4. The piston ring, as set forth in claim 3, in which the said under-cut is of step-like configuration and the said extension step is of complementary step-like configuration.

5. The piston ring, as set forth in claim 3, in which the said rib is of step-like configuration and the said cut-out is of complementary step-like configuration.

References Cited in the file of this patent

UNITED STATES PATENTS

| | | |
|---|---|---|
| 62,590 | Askwith | Mar. 5, 1867 |
| 1,000,135 | West | Aug. 8, 1911 |
| 1,210,371 | Gill | Dec. 26, 1916 |
| 1,223,296 | Siebert | Apr. 17, 1917 |
| 1,370,940 | Ashley | Mar. 8, 1921 |
| 1,720,504 | Williams et al. | July 9, 1929 |
| 2,621,990 | Szigeti | Dec. 16, 1952 |
| 2,670,257 | Bergeron | Feb. 23, 1954 |

FOREIGN PATENTS

| | | |
|---|---|---|
| 97,297 | Switzerland | Jan. 2, 1923 |
| 477,428 | Germany | June 6, 1929 |